United States Patent [19]
Schmidt et al.

[11] 4,274,247
[45] Jun. 23, 1981

[54] WINDROW-FORMING HARVESTER

[75] Inventors: Gerhard Schmidt, Kirschau; Christian Noack, Guttau; Klaus Ulrich, Neustadt; Volker Hänel, Neustadt; Bernd Kretschmar, Neustadt; Hans-Jochen Kloth, Uhyst A.T.; Wolfgang Pietsch, Neustadt; Peter Hesche, Bad Schandau; Theodor Eistert, Neustadt; Klaus Oliva, Langburkersdorf; Manfred Kreidler, Sebnitz, all of German Democratic Rep.

[73] Assignee: Veb Kombinat Fortschritt, Landmaschinen, Sachsen, German Democratic Rep.

[21] Appl. No.: 949,453

[22] Filed: Oct. 10, 1978

[30] Foreign Application Priority Data

Oct. 12, 1977 [DD] German Democratic Rep. ... 201476

[51] Int. Cl.³ .............................................. A01D 49/00
[52] U.S. Cl. .................................. 56/14.4; 56/DIG. 1
[58] Field of Search ................... 56/14.4, DIG. 1, 13.6

[56] References Cited

U.S. PATENT DOCUMENTS

| | | | |
|---|---|---|---|
| 3,546,861 | 12/1970 | Clendenin | 56/DIG. 1 |
| 3,608,286 | 9/1971 | Lausch et al. | 56/14.4 |
| 3,672,136 | 6/1972 | Peacock et al. | 56/14.4 |
| 3,751,889 | 8/1973 | Overesch | 56/13.6 |
| 4,142,349 | 3/1979 | Hellkuhl et al. | 56/14.4 |

*Primary Examiner*—Paul J. Hirsch
*Attorney, Agent, or Firm*—Karl F. Ross

[57] ABSTRACT

A hay-type crop harvester has a chassis supported on the ground on wheels and normally displaceable along the ground in a predetermined travel direction. A crop cutter is mounted ahead of the wheels on the chassis and extends transversely substantially the full width of the chassis so as to cut a swath of crop and pass it backward. A central crop conditioner is provided on the chassis between the wheels thereof and two outer crop conditioners are each provided on a respective side of the chassis to respective sides of the wheels. An auger provided with oppositely directed screwthread formations at each of the conditioners transports the crop laterally so that after being cut in a single wide swath it is subdivided into three portions each of which is fed to a respective conditioner. Thereafter the portions may be laid down in windrows between and outside the wheels of the harvester.

10 Claims, 5 Drawing Figures

WINDROW-FORMING HARVESTER

FIELD OF THE INVENTION

The present invention relates to a windrow-forming harvester. More particularly, this invention concerns such a harvester used for cutting a hay-type crop and strewing same on the ground for drying.

BACKGROUND OF THE INVENTION

Hay-type crops, normally forage plants that are dried out before being collected and either stored or eaten, are typically cut and then left in the field to dry for a predetermined amount of time before they are picked up and baled, prepared for silage, or otherwise treated. Such a harvester normally has a chassis adapted to travel along the ground in a predetermined direction and provided with a crop cutter extending transversely to this direction and serving to cut a swath in the crop. After cutting, the crop is laid in the field normally in windrows extending in the direction of travel of the harvester.

The standard system has the cutter mounted on the front of a self-powered chassis. Provided on this chassis between the wheels thereof is a crop conditioner, normally a pair of horizontally extending rollers between which the crop passes, and the chassis is further provided with a transverse conveyor that displaces that crop lying outside and in front of the wheels to between the wheels. After passing through the conditioner the crop is formed into a single windrow that lies between the wheels of the chassis.

The disadvantage with this system is that the single windrow is relatively tall, especially when the machine has a large overall width. Thus the crop in this windrow will be relatively compact, so that subsequent spreading and tedding will be necessary for drying it out. Furthermore as all of the crop must pass through the conditioner that can have a maximum length equal to the distance between the vehicle wheels, the conditioning is often inadequate. Furthermore the subsequent step of spreading or tedding the crop further adds to the cost of the operation.

Another device is known from German patent publication No. 1,942,733. This has a cutter and a transfer conveyor mounted on the machine. Between the wheels of the machine is the conditioner which is provided above a cover plate on whose end is provided a pivotal deflecting plate. For the deflecting plate there is provided on the chassis above the ground a strewer which is formed of two counterrotating and overlapping strewing disks. The cut crop from the cutter is pushed together by the conveyor to a width equal to the distance between the wheels of the vehicle and fed to the conditioner. The conditioner in turn draws the crop obliquely upwardly against the cover plate, thence is conducted to the deflecting plate. Thereafter it falls on to the underlying spreader which lays the crop on the field in a windrow wider than the distance between the rear wheels of the vehicle. Accordingly these rear wheels will ride over the crop, pressing some into the ground, knocking some grain loose, and generally damaging the crop. Even with this arrangement, however, the crop is still formed into a relatively thick windrow that takes considerable drying time and often requires subsequent spreading or tedding.

Another arrangement is known from German patent publication No. 1,632,846 which comprises a tractor and two cutters provided on the front of the tractor next to each other. These cutters are supported on a frame which rides on the ground. In this arrangement the crop is thrown to the right and left next to the tractor in two windrows. The disadvantage of this system is that it is very expensive, necessitating two separate cutting and conveying arrangements. Furthermore, the crop between the two cutters is frequently lost, and even so the two windrows formed by the device still are relatively thick and require considerable drying time.

OBJECTS OF THE INVENTION

It is therefore an object of the present invention to provide an improved harvester for a hay-type crop, that is for a crop which is dried out before being collected and/or used.

Another object is the provision of such a harvester which is relatively simple and inexpensive, yet which allows the crop to dry out in a minimal amount of time and with minimal crop loss and damage.

SUMMARY OF THE INVENTION

These objects are attained according to the instant invention in a harvester of the above-described general type, but wherein the machine has behind the cutter a number of crop conditioners equal to one more than the number of wheels of the vehicle, counting in a direction transverse to its normal direction of travel. Thus on a normal four-wheel vehicle with the rear wheels directly behind the front wheels, the machine has three crop conditioners. The conveyor is set up to transport the crop coming backwardly from the cutter into these three conditioners so that three separate windrows are formed, a central one between the two wheels and two outer ones each to a respective outer side of a respective wheel. Between these windrows is a pair of generally crop-free gaps in which the wheels ride.

Thus with the system according to the instant invention the wheels of the vehicle need not ride over the windrows of cut crop. At the same time the cut crop is spread out as widely as possible in normally three separate windrows so that minimum crop depth in each windrow can be obtained. Normally a subsequent spreading or tedding of the crop can be dispensed with in such a system as the windrows are sufficiently shallow that the crop can dry out in them in a relatively short time.

According to this invention the conveyor basically comprises a single auger extending transverse to the travel direction and formed with a respective pair of screw thread formations for each windrow. The screw formations of each pair are of opposite hand and the auger is so rotated that the cut crop coming backwardly from the cutter is displaced transversely toward the center of each windrow, that is toward the center of each conditioner. The outer ends of the screw thread formations, that is the ends thereof remote from the centers of the respective conditioners, have a relatively great radial height above the auger, and this height decreases toward the center of the respective conditioner. As a result the cut crop is surely and accurately conveyed transversely to the conditioners so as to form the above-described three windows and two crop-free gaps. The use of such an auger arrangement with screwthread formations of opposite hands insures a very gentle and sure separation of the crop into three portions without damage to or bunching-up of the normally long-stemmed crop.

According to another feature of this invention the number of screwthread formations is doubled, so as to produce a pair of central windrows and two outer pairs of windrows. It has been found that when each of the windrows is thus subdivided into two parallel windrows with a relatively narrow gap between them the surface area is increased considerably, as is the drying time.

In accordance with this invention the chassis is further provided with at least one deflecting plate to one side of the chassis. This plate can be set to narrow the corresponding outer windrows, so as to produce a track large enough for the machine to cut its next swath without missing any crop or damaging previously harvested and windrowed crop.

It is also within the scope of this invention to provide deflecting rods immediately behind the conditioners and extending or directed backwardly past the front wheels of the vehicle. These deflector rods spread the crop issuing from the conditioners over the entire width of the machine. The back wheels of the machine will, therefore, ride over some of the crop, but since these back wheels are typically under a relatively small load the damage to the crop will be minimal. Such an arrangement as used when maximum spreading must be obtained for quickest possible drying of the crop.

The system according to the instant invention thereby allows a relatively wide swath of crop to be cut. At the same time the crop is formed into at least three relatively shallow windrows so that drying of this crop is a relatively rapid and efficient process. The machine has a relatively simple structure, in spite of the excellent operational effectiveness, and is in fact considerably less expensive to produce and operate than many of the less efficient prior-art devices.

SPECIFIC DESCRIPTION

Figure 1:
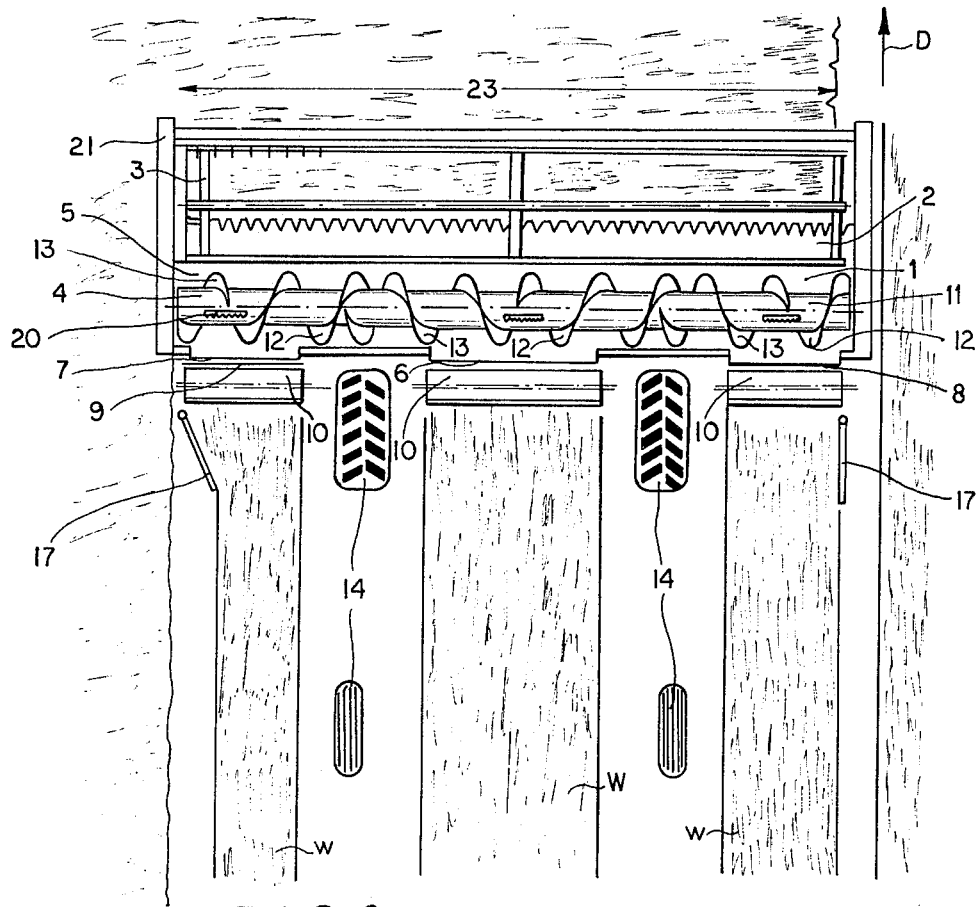
FIG. 1 is a top partly schematic view of a harvester according to the instant invention.
Figure 2:
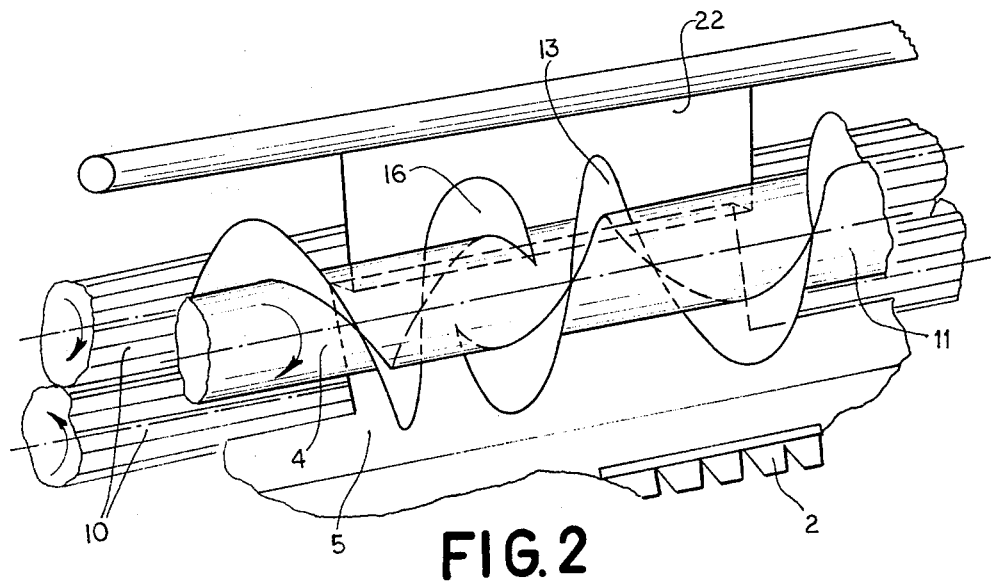
FIG. 2 is a perspective view of a detail of FIG. 1.

The machine shown in FIGS. 1 and 2 has a cutter 1 provided with a sickle-bar type blade 2 that is reciprocated transversely to the normal travel direction D of the chassis 21 of the machine. Provided above this cutter 1 is a reel 3 rotatable about a horizontal axis at the frontmost part of the chassis 21. A feed gap 5 behind the cutter 1 in direction D is defined by the cutter 1 and a conveyor 4.

This conveyor 4 operates to deliver cut crop as will be described below to a central output 6 or discharge area, a left hand output or discharge area 7, and a right-hand output 8, any of which can be covered if desired by plates 9. Each of the outputs 6–8 is associated with a respective conditioner 10 comprised as shown in FIG. 2 by a pair of vertically spaced ribbed rollers that are rotatable in opposite directions and serve to partially crush the crop.

The conveyor 4 comprises an auger having a cylindrical core 11 that is rotated about a horizontal axis by means of the prime mover carried on the chassis 21. This auger 4 is formed with three right-hand screwthread formations 12 and with three left-hand screwthread formations 13. The formations 12 and 13 overlap in front of each of the wheels 14 of the vehicle, and the rotational direction of the conveyor 4 is such that the crop fed to them will automatically be conveyed transversely away from in front of these wheels 14 to the respective discharge areas. The screwthread formations 12 and 13 are of maximum radial dimension directly in front of the wheels 14, tapering off in a transverse direction.

According to the instant invention the crop is therefore cut along a relatively wide swath having a transverse dimension 23 and is then conveyed transversely to form a central relatively wide windrow W between the wheels 14 and a pair of relatively narrow outer windrows w each to a respective side of the wheels 14. The wheels 14 themselves will be able to ride on the ground in crop-free gaps.

In addition the device may be provided with blocking plates 22 in front of the wheels 14. The rollers forming the conditioners 10 may furthermore be throughgoing and merely exposed by these plates 22 between the wheels and to each side of the wheels for simplest possible construction. The auger conveyor 4 is provided with radially projecting and axially extending toothed pusher plates 20 that ensure proper pushing of the crop into the respective conditioner 10.

Flaps 17 provided at the back of the cutting arrangement are pivotal about vertical axes and can be set as shown to the left in FIG. 1 to narrow the respective outer windrows w. Such narrowing leaves a gap between the windrow and the uncut crop so that during the next cut the operator can easily ascertain where the edge of the uncut crop lies and can very accurately harvest the crop.

Figures 3, 3A:
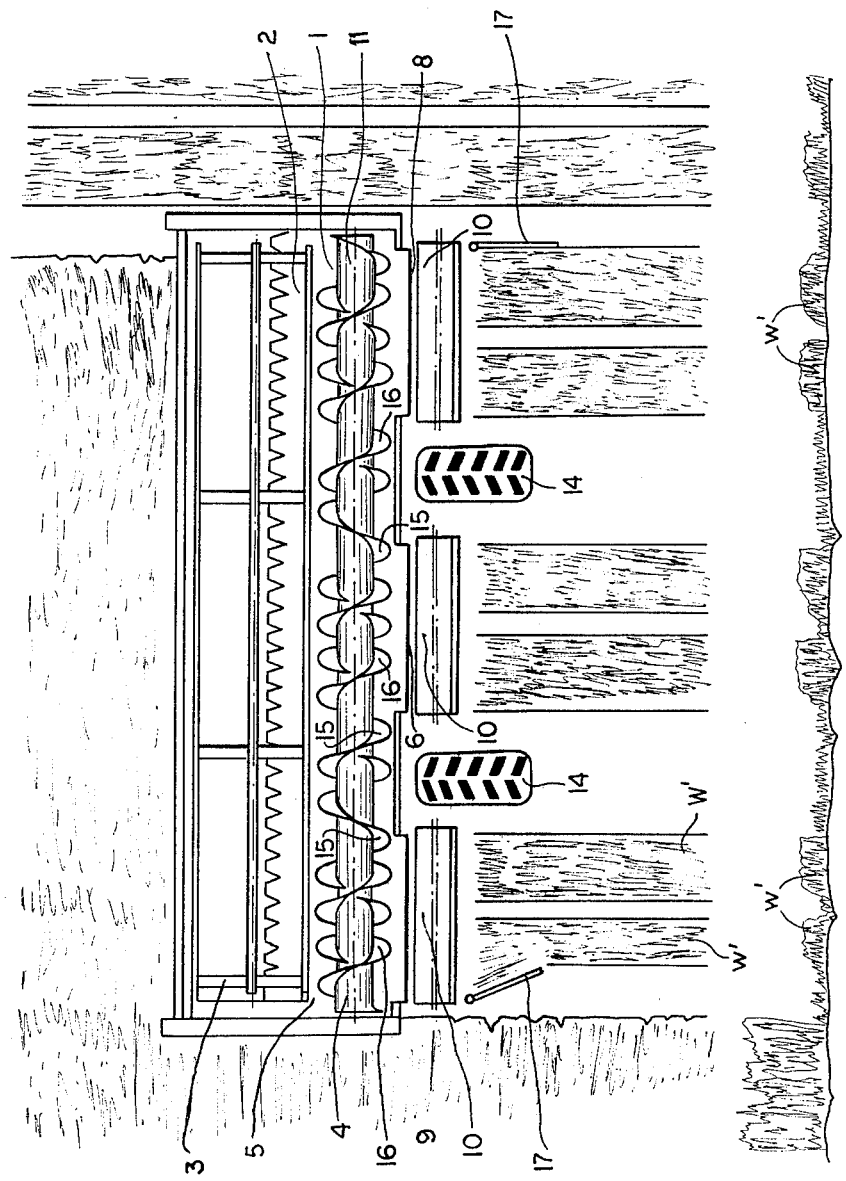
FIG. 3 is a top view similar to FIG. 1 showing another arrangement according to this invention.
FIG. 3A is a horizontal end view of the windrowed crop laid down by the device of FIG. 3.

It is also possible as shown in FIG. 3, where reference numerals identical to these of FIG. 1 are used for structurally identical subject matter, to double the number of screwthread formations, using six right-hand formations 15 and six left-hand formations 16. These formations are therefore doubled up so as to produce six relatively narrow windrows w' instead of three wider windrows. FIG. 3a illustrates how such narrower windrows w' will leave more of the crop exposed to the air for faster drying. The ends of the formations 15 and 16 overlap in the region of the wheels 14 and in the middle of each the conditioners 10 and similarly in these regions the formations 15 and 16 are of maximum height, tapering off laterally.

Figure 4:
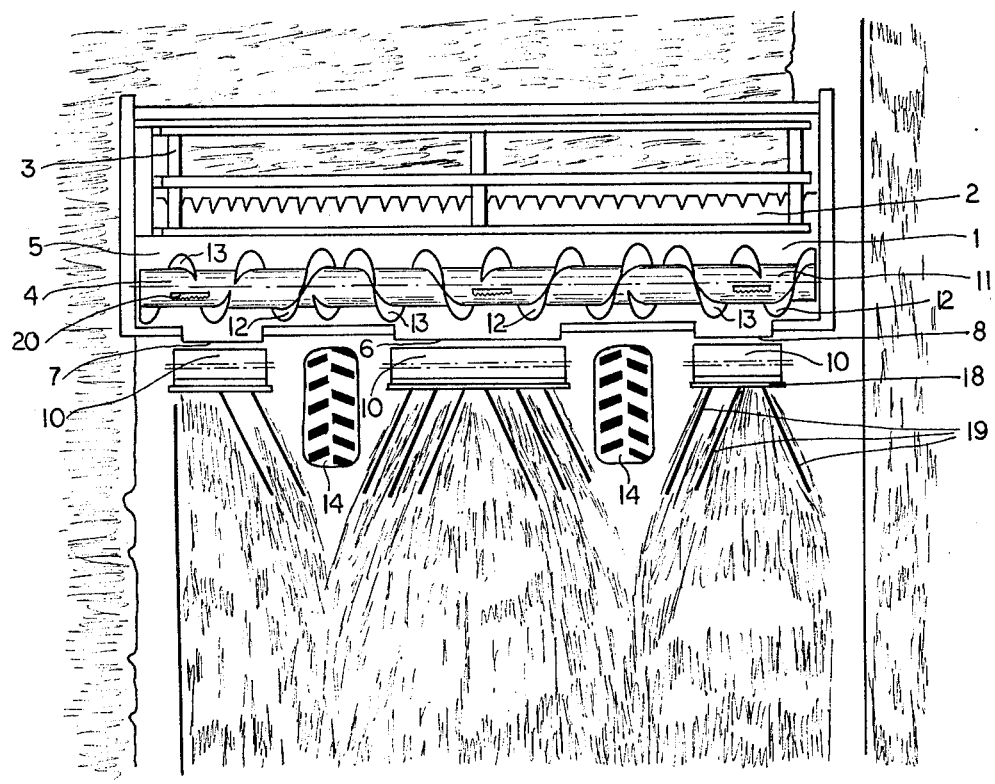
FIG. 4 is a top view of yet another machine according to this invention.

It is also possible as shown in FIG. 4 to replace the deflecting plates 17 with windrow formers 18 having backwardly obliquely extending rods 19 that strew the crop over the entire width 23 of the machine. With such an arrangement the rear wheels of the vehicle will, indeed, ride over the crop, but since these wheels are not loaded anywhere near as heavily as the front wheels any damage to the crop will be minimal. Such an arrangement is used when rapid drying is essential, as when the crop must be harvested when rain is expected.

We claim:
1. A harvester comprising:
a chassis;
a pair of wheels supporting said chassis on the ground for displacement in a normal travel direction and spaced apart in a direction transverse to said travel direction;

a crop cutter mounted on said chassis ahead of said wheels in said travel direction and extending transversely substantially the full width of said chassis for cutting a swath of crop having a width generally equal to the width of said chassis;

a central crop conditioner on said chassis behind said cutter in said travel direction and between said wheels in said transverse direction;

a pair of outer crop conditioners on said chassis behind said cutter in said travel direction and each outside a respective wheel in said transverse direction; and transverse conveyor means on said chassis between said conditioners and said cutter for receiving cut crop from said cutter and conveying same in respective outer and central portions to said conditioners, whereby the cut crop can form a central windrow between said wheels, a pair of outer windrows each outside a respective wheel, and a pair of generally crop-free gaps between said windrows at said wheels.

2. The harvester defined in claim 1 wherein said cutter includes a blade extending transversely substantially said full width, and means on said chassis for transversely displacing said blade and thereby cutting said swath.

3. The harvester defined in claim 2, further comprising a reel on said chassis at said cutter and extending transversely substantially said full width.

4. The harvester defined in claim 1 wherein said conveyor means includes an auger extending generally said full width and having a plurality of screw formations of opposite hand.

5. The harvester defined in claim 4 wherein said auger has at least two pairs of such formations each terminating relative to said travel direction in front of a respective wheel, said conveyor means including means for rotating said auger for drawing crop transversely away from in front of said wheel.

6. The harvester defined in claim 4 wherein said auger has a pair of such screw formations of opposite hand for each of said windrows, each of said formations having one end in front of the center of the respective windrow relative to said travel direction.

7. The harvester defined in claim 1, further comprising a deflecting plate on said chassis in front of each of said wheels and behind said conveyor.

8. The harvester defined in claim 6 wherein each of said screw formations has a radial height that increases from the center of the respective windrow laterally outwardly.

9. The harvester defined in claim 1 wherein each of said conditioners includes on said chassis a pair of transversely extending rollers and means for rotating said rollers to displace said crop backwardly in said travel direction from said conveyor into said windrows.

10. The harvester defined in claim 1, further comprising to one lateral side of said chassis behind said conditioners means on said chassis including a deflecting plate for laterally deflecting and narrowing the respective windrow.

* * * * *